United States Patent
Breitner

(10) Patent No.: US 6,622,427 B2
(45) Date of Patent: Sep. 23, 2003

(54) SPRAYING A LIQUID ON PLANTS BY MEANS OF A SPRAYING ASSEMBLY MOUNTED ON A PAIR OF WIRES

(75) Inventor: Joseph Breitner, D.N. Hefer (IL)

(73) Assignee: Netafim (A.C.S.) Ltd., Tel-Aviv (IL)

( * ) Notice: Subject to any disclaimer, the term of this patent is extended or adjusted under 35 U.S.C. 154(b) by 0 days.

(21) Appl. No.: 10/105,511

(22) Filed: Mar. 26, 2002

(65) Prior Publication Data

US 2002/0189160 A1 Dec. 19, 2002

(30) Foreign Application Priority Data

Mar. 26, 2001 (IL) ................................................ 142245

(51) Int. Cl.$^7$ ................................................ A01G 29/00
(52) U.S. Cl. ................................................ 47/48.5
(58) Field of Search ............................ 47/2, 48.5, 57.7, 47/58.1, 79, 82, 83; 239/268, 276, 289; 405/36, 37, 39, 40, 41, 43, 48, 50, 51

(56) References Cited

U.S. PATENT DOCUMENTS

| | | | |
|---|---|---|---|
| 2,631,061 A | * 3/1953 | Nelson | 239/256 |
| 3,345,774 A | * 10/1967 | Delbuguet | 47/48.5 |
| 3,357,129 A | * 12/1967 | Torrence | 47/79 |
| 3,630,448 A | * 12/1971 | Chapin | 239/101 |
| 3,701,477 A | * 10/1972 | Matt et al. | 239/276 |
| 3,844,516 A | * 10/1974 | Klarke | 248/88 |
| 3,865,309 A | * 2/1975 | Greenhalgh | 239/268 |
| 4,037,788 A | * 7/1977 | Riley | 239/207 |
| 4,333,266 A | 6/1982 | Babo | |
| 4,795,100 A | * 1/1989 | Purtell et al. | 239/734 |
| 4,938,420 A | * 7/1990 | Ruttenberg | 239/68 |
| 5,099,602 A | * 3/1992 | Arnold et al. | 47/47 |
| 5,310,281 A | * 5/1994 | Elena | 405/39 |
| 5,743,300 A | * 4/1998 | McNeill | 138/107 |
| 5,881,495 A | * 3/1999 | Clark | 47/48.5 |
| 5,921,443 A | * 7/1999 | McMillan | 222/174 |
| 6,168,092 B1 | * 1/2001 | Schneider | 239/203 |

FOREIGN PATENT DOCUMENTS

| | | | | |
|---|---|---|---|---|
| JP | 6205614 A | * | 7/1994 | 47/48.5 |
| WO | PCT97 03553 | | 2/1997 | |

* cited by examiner

Primary Examiner—Charles T. Jordan
Assistant Examiner—Francis T. Palo
(74) Attorney, Agent, or Firm—Browdy and Neimark, P.L.L.C.

(57) ABSTRACT

A method for spraying a liquid on plants by means of a spraying assembly adapted for mounting on a pair of upper and lower wires parallel to each other. The spraying assembly comprises a sprayer having at least one nozzle adapted for fluid communication with a source of the liquid, and a sprayer holder. The sprayer holder comprises a rigid rod and upper and lower holder members mounted on the rod and having clamping means for being clamped to the respective upper and lower wires. One of the holder members has a sprayer seat for fixedly supporting the sprayer in a predetermined orientation relative to the rod.

15 Claims, 4 Drawing Sheets

SPRAYING A LIQUID ON PLANTS BY MEANS OF A SPRAYING ASSEMBLY MOUNTED ON A PAIR OF WIRES

FIELD OF THE INVENTION

This invention relates to sprayers for leafy plants, in particular for use with plants that grow in rows on two or more wires extending between supporting stakes, for spraying thereon anti-frost liquids, chemicals or the like.

BACKGROUND OF THE INVENTION

In viticulture, it is know to prevent frost-damage of vines either by covering vine-stock rows with plastic film, such as for example suggested in WO 97/03553, or by spraying the vine-stocks with water. The latter is normally performed by sprayers that are either mounted on hoses installed above the vine-stock rows or are attached to stakes supporting wires on which each row grows. The sprayers may also be installed on a machine, such as a vine-dressing machine described in U.S. Pat. No. 4,333,266, adapted to pass between the vine-stock rows.

SUMMARY OF THE INVENTION

In accordance with different aspects of the present invention, there are provided a novel method and a novel spraying assembly for spraying a liquid on plants, and also a novel sprayer holder for use therein.

The method, in accordance with one aspect of the present invention, includes the steps of:
(a) providing at least a pair of upper and lower wires parallel to each other and extending between wire-supporting stakes;
(b) providing at least one spraying assembly including a sprayer with at least one spraying nozzle and a sprayer holder with a rigid rod and upper and lower holder members mounted on said rod, one of said holder members having a sprayer seat for fixedly supporting said sprayer in a predetermined orientation relative to said rod;
(c) clamping said upper and lower members to the respective upper and lower wires in a predetermined orientation relative thereto so that, upon disposing said sprayer in said seat, said at least one nozzle faces the plants; and
(d) providing a fluid connection between said nozzle and a source of said liquid.

Another aspect of the present invention is connected with a spraying assembly for mounting a sprayer on a pair of upper and lower wires parallel to each other and extending between wire-supporting stakes. The assembly comprising a sprayer having at least one nozzle adapted for fluid connection with a source of said liquid, and a sprayer holder in the form of a rigid rod and upper and lower holder members mounted on said rod and having clamping means for being clamped to the respective upper and lower wires, one of said holder members having a sprayer seat for fixedly supporting said sprayer in a predetermined orientation relative to said rod.

Still another aspect of the present invention is connected with a holder for a sprayer having at least one nozzle, the holder comprising a rigid rod and upper and lower holder members mounted on said rod, one of said holder members having a sprayer seat for fixedly supporting said sprayer in a predetermined orientation relative to said rod. The holder is adapted for mounting on a pair of parallel wires and said upper and lower members have means for being clamped thereto.

When the sprayer assembly is mounted on two wires in accordance with the method of the present invention, the sprayer appears to be rigidly fixed in place in a required orientation relative to plants to be sprayed, due to the combined effect of the rigid rod and the clamping means of the upper and lower holder members.

Preferably, the method of the present invention is used for spraying plants such as, for example, vine-stacks, growing in a row on at least said upper and lower wires, where a plurality of assemblies of the present invention may be mounted between the wire supporting stakes. In this case, it is preferable that said sprayer has two nozzles facing in diametrically opposite directions perpendicular to an imaginary plane passing through said rod and a common vertical axis of the holder members. The sprayer assembly is then mounted on the upper and lower wires so that said imaginary plane is perpendicular thereto, whereby it is ensured that said nozzles are directed along said wires in two opposite directions.

Thus, the sprayer, when mounted in the sprayer holder of the present invention, may always be protected by the sprayer holder from any contact with agricultural machinery, such as vine-dressing machines. The sprayer is always kept in its fixed position relative to the row of vine-stacks, whereby any necessity of its adjustment is eliminated. The assembly has completely self-sufficient mounting means independent of the wire-supporting stakes and, therefore, a plurality of such assemblies may be mounted at any appropriate locations along the wires with any required pitch therebetween. The arrangement of the spraying assemblies on the wires enables them to follow any trajectory of plant rows, whereby any need in additional 'compensating' sprayers is eliminated. The assembly is suitable for a range of diameters of the wires and is adapted for the adjustment to any distance between the wires.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
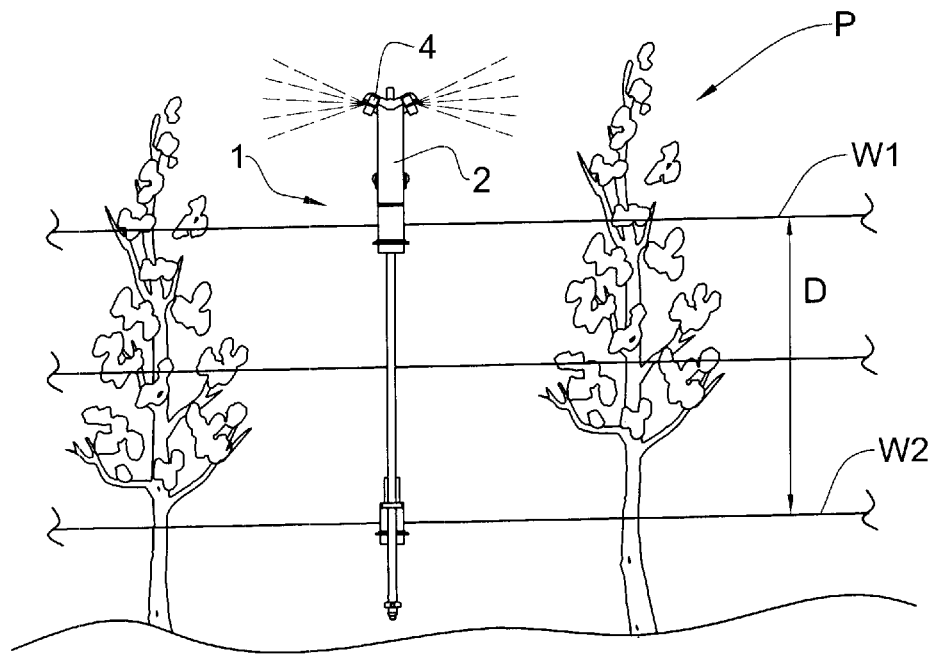
FIG. 1 is a schematic view of a spraying assembly of the present invention, mounted on two wires.

As illustrated in FIG. 1, a spraying assembly 1 of the present invention is designed for strip spraying a row of plants P growing on a plurality of wires and it is adapted for being mounted on an upper wire W1 and a lower wire W2 having a distance D therebetween. The wires extend between wire-supporting stakes that are not shown.

Figure 5:
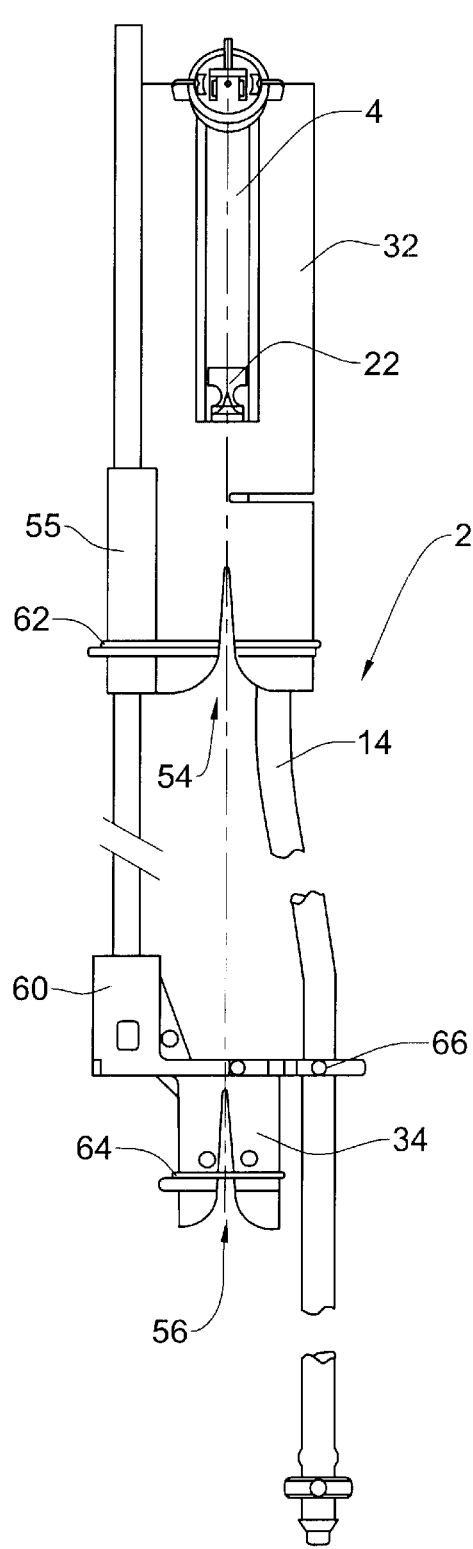
FIGS. 5 and 6 are views of the spraying assembly shown in FIG. 1, in the respective directions along and perpendicular to the wires, on which the assembly is mounted.
Figure 6:
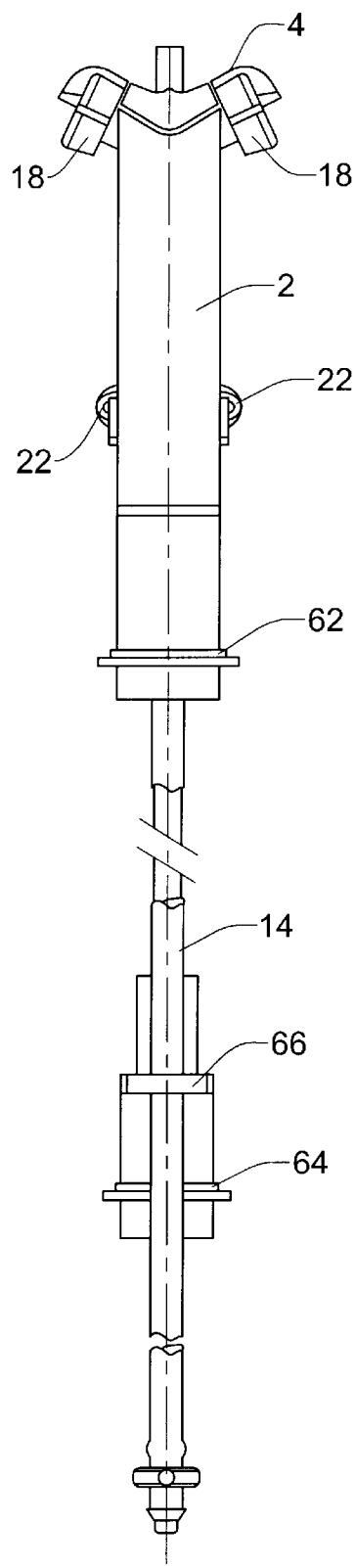

As seen in FIG. 1 and shown in detail in FIGS. 5 and 6, the assembly 1 comprises a sprayer holder 2 and a sprayer 4 mounted in the sprayer holder 2 and adapted for fluid connection with a source of liquid to be sprayed (not shown). The liquid may, for example, be water or other frost prevention composition.

Figure 3:
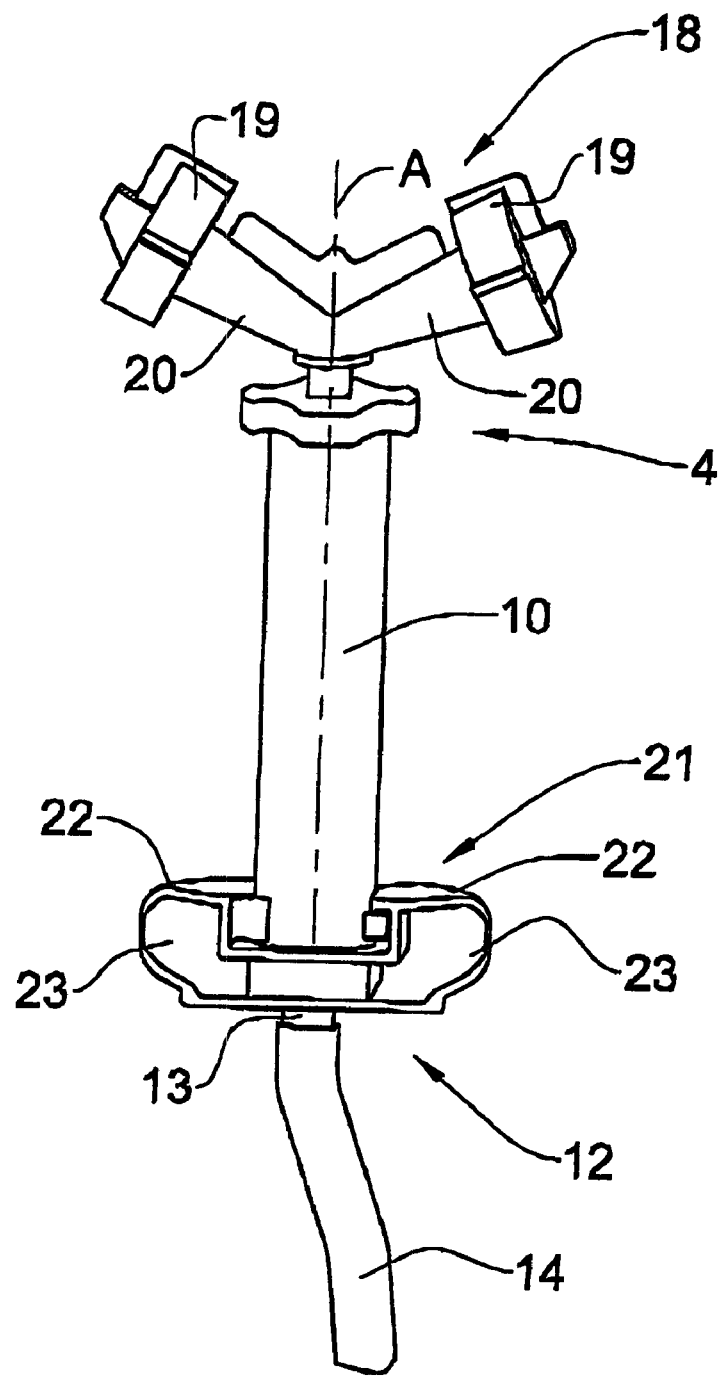
FIG. 3 is a perspective view of a sprayer used in the spraying assembly shown in FIG. 1.

With reference to FIG. 3, the sprayer 4 has a cylindrical body 10 extending along an axis A, having an upstream end 12 formed with a liquid inlet 13 to be connected by a hose 14 to a pipe communicating with the source of liquid, and a downstream end 16 carrying a spraying head 18. The spraying head 18 has two nozzles 19 connected with the sprayer's body by corresponding necks 20 and facing in two diametrically opposite directions relative to the axis A. The necks 20 and, consequently, the nozzles 19 are in fluid communication with the liquid inlet 13. The sprayer 4 may have any appropriate internal design and, for example, it may be a STRIPNET emitter manufactured by Netafim "Drip Irrigation" (C. S.) Ltd, Israel. It should be noted that, since the sprayer 4 does not constitute a subject matter of the present invention, its internal design will not be described in the present application in more detail.

The sprayer 4 is further provided with a locking arrangement 21, either attached thereto or formed integrally therewith, for the fixation of the sprayer in its position in the sprayer holder 2. The locking arrangement is preferably located adjacent the upstream end 12 of the sprayer, but this location may be anywhere along its length. The locking arrangement includes ears 22 that extend outwardly from the periphery of the sprayer's body 10 and are oriented in the same manner, relative to the axis A, as the nozzles 19. The ears 22 have locking recesses 23 on both sides thereof.

Figure 2:
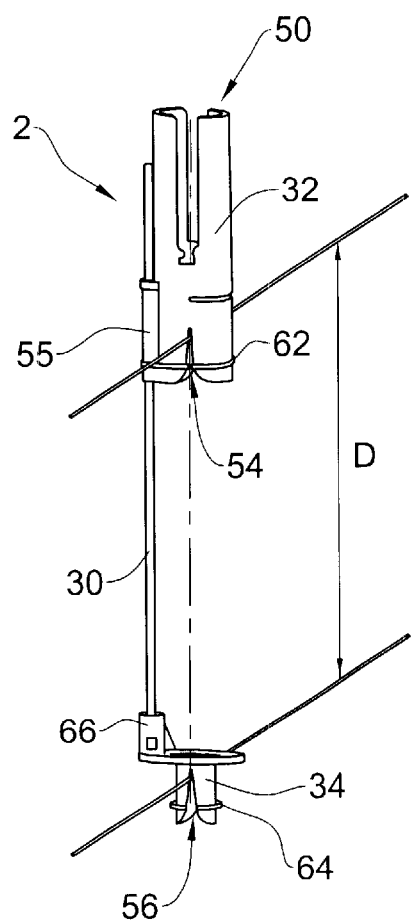
FIG. 2 is a perspective view of a sprayer holder used in the spraying assembly shown in FIG. 1.

With reference to FIG. 2, the sprayer holder 2 comprises a rigid rod 30 and upper and lower holder members 32 and 34 mounted thereon. The rod 30 has a length essentially exceeding the distance D between the upper and lower wires W1 and W2, on which the entire assembly is to be mounted as shown in FIG. 1.

Figure 4:
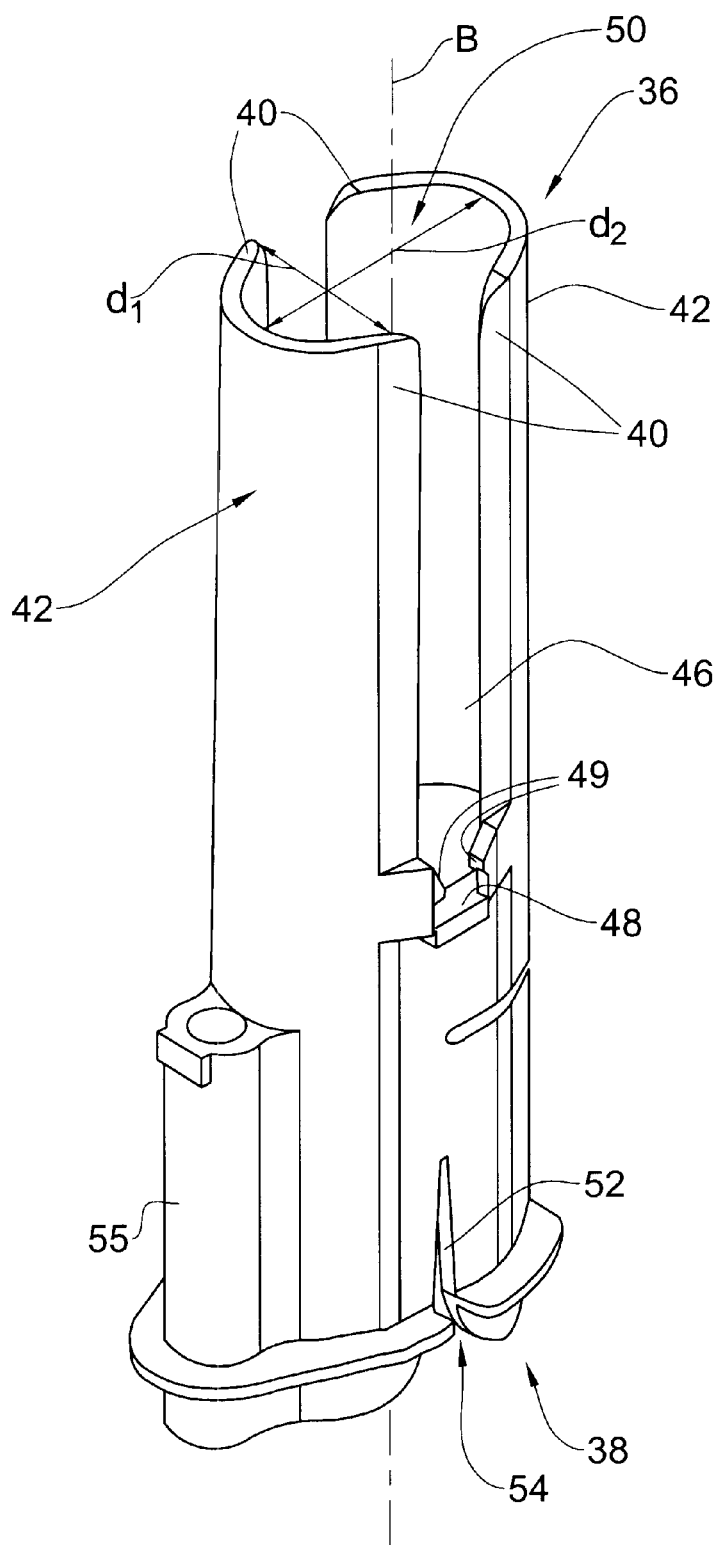
FIG. 4 is a perspective view of an upper member of the sprayer holder shown in FIG. 32.

The upper holder member 32, shown in more detail in FIG. 4, has an elongated tubular shape and upper and lower ends 36 and 38. The holder member 32 has an oval cross-sectional shape and, consequently, its first wall portions 40 have a distance d1 therebetween, which is smaller than a distance d2 between its second wall portions 42. Both distances d1 and d2 are greater than the diameter of the cylindrical body portion 10 of the sprayer 4, and the distance d1 is at least slightly smaller than that between the nozzles 19 of the sprayer 4.

The first wall portions 40 of the holder member 32 are formed with elongated cutouts 46 extending downwardly from the upper end 36 thereof and having a width that is broader than the neck portions 20 of the nozzles 19 and broader than the thickness of the ears 22 of the sprayer's locking arrangement 21. The cutouts 46 terminate at sockets 48 which are adapted to engage the ears 22 and which have locking projections 49 adapted to enter the locking recesses 23 of the ears. The first wall portions 40 of the upper holder member 32 with their cutouts 46 and the sockets 48, together with the second wall portions 42 associated therewith, all constitute a sprayer seat, which is generally designated as 50. The first wall portions 40 are further formed at the lower end 38 of the holder member 32, with wedge-shaped slits 52, constituting therebetween a wire-receiving slot 54.

One of the second wall portions 42 of the holder member 32 is formed with a sleeve 55 for receiving therein the rod 30 with slide fit, enabling the movement of the holder member 32 around the rod 30 and also therealong, upon the application to the holder member 32 of a force exceeding a friction force between the sleeve 55 and the rod 30.

Reverting to FIG. 2, the lower holder member 34 is similar to the upper holder member 32 in that it is also generally tubular, it has a wedge-shaped wire-receiving slot 56 and a pocket 60 for receiving therein the rod 30 so as to enable the rotation of the holder member 34 around the rod 30, preventing it however from the movement therealong.

The assembly 1 further comprises clamping means 62 and 64 capable of tightening the respective wire-receiving slots 54 and 56 with the wires W1 and W2 passing therethrough, to prevent the movement of the upper and lower holder members 32 and 34 relative to the wires.

For mounting the sprayer holder 2 on the wires W1 W2, the lower holder member 34 is mounted first and secured by the clamping means 64, and the position of the upper holder member 32 is subsequently adjusted, in accordance with the distance D between the wires, and secured by the clamping means 62. When the upper and lower holder members 32 and 34 are mounted on the wires W1 and W2, their vertical axes (not shown) coincide and are parallel to the rod 30, and an imaginary plane passing through the rod 30 and these vertical axes is perpendicular to the wires.

With reference to FIGS. 5 and 6, to mount the sprayer 4 in the upper holder member 32, its body 10 is inserted into the seat 50 so that the ears 22 of the locking arrangement 21 project outwardly through, and freely pass downwardly along, the cutouts 46 until these ears abut the locking projections 49 of the sockets 48 of the upper holder member 32. Upon the application of a downward force on the sprayer 4, the locking projections 49 enter the locking recesses 23 of the ears 22, thereby forming a snap joint and fixing the sprayer in place. In this position, the nozzles protrude from the cutouts 46 at the upper end 34 of the holder member 32, with their neck portions 20 passing therethrough.

With the sprayer 4 being mounted in the upper holder member 32 as shown in FIGS. 5 and 6, the hose 14 thereof projects from the lower end 38 of the member 32 and it may further be directed in a desired direction by passing through a corresponding ring portion 66 formed on the lower holder member 34.

The sprayer 4 may be mounted in the sprayer holder 2 either before or after the latter is mounted on the wires, and the construction of sprayer holder ensures that the nozzles 19 face in two diametrically opposite directions along the wires, while the sprayer's body is fully accommodated by the sprayer holder.

It should be understood that the assembly of the present invention and the method of its mounting on wires may differ from those described above and illustrated by the drawings, within the framework of the general concept of the invention. This general concept is to use wires as a support for the spraying assembly, and it does not necessarily matter in which direction(s) the spraying needs to be performed. Thus, for example, the assembly of the present invention may be located on wires extending perpendicularly to a row of plants and the sprayer then would need a nozzle facing perpendicularly to the wires. The sprayer may also have a rotating nozzle. The sprayer holder members may have different arrangements for their mounting on wires and they may be carried by an element other than the rod. The sprayer seat may be arranged in a lower rather than upper holder member and it may have any appropriate design. Any other alternatives for different features of the present invention are possible, within the skills of an average person in the art.

| List of references used in the drawings | |
|---|---|
| 1 | spraying assembly |
| 2 | sprayer holder |
| 4 | sprayer |
| 10 | cylindrical body portion of the sprayer |
| 12 | upstream end of the sprayer |
| 13 | liquid inlet of the sprayer |
| 14 | hose |
| 16 | downstream end of the sprayer |
| 18 | spraying head |
| 19 | nozzles |
| 20 | necks |
| 21 | locking arrangement |
| 22 | ears |
| 23 | locking recesses |
| 30 | rigid rod |
| 32 | upper holder member |
| 34 | lower holder member |
| 36 | upper end of the upper holder member |
| 38 | lower end of the upper holder member |
| 40 | first wall portions of the upper holder member |
| 42 | second wall portions of the upper holder member |
| 46 | cutouts in the upper holder member |
| 48 | sockets |
| 49 | locking projections |
| 50 | sprayer seat |
| 52 | wedge-shaped slits |
| 54 | wire-receiving slot of the upper holder member |
| 55 | sleeve |
| 56 | wire-receiving slot of the lower holder member |
| 60 | pocket in the lower holder member |
| 62 | clamping means of the upper holder member |
| 64 | clamping means of the lower holder member |
| 66 | ring portion in the lower holder member |

What is claimed is:

1. A spraying assembly adapted for mounting on a pair of upper and lower wires parallel to each other, the assembly comprising a sprayer having at least one nozzle adapted for fluid communication with a source of liquid, and a sprayer holder in the form of a rigid rod and upper and lower holder members engaging said rod at spaced apart locations thereon and having each clamping means for being clamped to one of said upper and lower wires, one of said holder members having a sprayer seat capable of fixedly supporting said sprayer in a predetermined orientation relative to said rod.

2. A spraying assembly according to claim 1, wherein said sprayer has a vertical axis spaced apart from said rod and said clamping means are so constructed that, when the assembly is mounted on said wires, an imaginary plane passing through said axis and said rod is perpendicular to said wires.

3. A spraying assembly according to claim 2, wherein said sprayer has two nozzles and it is mounted in said sprayer seat so that said nozzles face in directions perpendicular to said imaginary plane.

4. A spraying assembly according to claim 1, wherein said sprayer seat is formed inside said one of the holder members, which accommodates said sprayer so that only said at least one nozzle projects from the holder member.

5. A spraying assembly according to claim 1, wherein said one of the holder members has a vertical axis spaced apart from, and parallel to, said rod, and said sprayer is so accommodated in said sprayer seat that said at least one nozzle projects from that holder member in the direction away from said vertical axis.

6. The spraying assembly according to claim 1, wherein said one of the holder members is a tubular body with a vertical axis spaced from said rod and said sprayer holder having an imaginary plane passing through said axis and said rod.

7. The spraying assembly according to claim 6, wherein said tubular body has said sprayer seat and wall portions formed with at least one cutout so that, when said sprayer is mounted in said seat, said at least one nozzle projects from said tubular body via said cutout in a spraying direction.

8. The spraying assembly according to claim 7, wherein said wall portions are oriented substantially parallel to said imaginary plane, to ensure that when the sprayer is mounted in the sprayer seat, said at least one nozzle is oriented perpendicular to said imaginary plane.

9. The spraying assembly according to claim 1, wherein each holder member has a rod-engaging portion spaced from the clamping means of said member in the direction away from the rod.

10. The spraying assembly according to claim 9, wherein said rod-engaging portion is a sleeve and said rod is received within the sleeves of both holder members.

11. The spraying assembly according to claim 1, wherein said clamping means of at least one of the holder members comprises an open-ended wire-receiving slot adapted for being tightened with a wire inserted therein.

12. The spraying assembly according to claim 1, wherein said sprayer is carried by only one of the holder members, whose dimension in the direction along said rod is greater than that of the other holder member.

13. The spraying assembly according to claim 12, wherein said one of the holder members is the upper holder member.

14. The spraying assembly according to claim 1, wherein said holder members have upper and lower ends and in at least one of the holder members said clamping means are formed at the lower end thereof.

15. The spraying assembly according to claim 1, wherein said rod is carried solely by the holder members and the clamping means of the holder members are the only means by which the assembly is adapted to be held on said wires.

* * * * *